United States Patent
Aizawa et al.

(10) Patent No.: US 11,180,101 B2
(45) Date of Patent: Nov. 23, 2021

(54) SENSOR ATTACHMENT STRUCTURE AND ENERGY ABSORPTION STRUCTURE

(71) Applicant: HONDA MOTOR CO., LTD., Tokyo (JP)

(72) Inventors: Teruaki Aizawa, Wako (JP); Tatsuya Ishizaki, Wako (JP); Hiroyuki Midorikawa, Wako (JP); Masaki Umezawa, Wako (JP); Keita Kataoka, Isesaki (JP)

(73) Assignee: HONDA MOTOR CO., LTD., Tokyo (JP)

( * ) Notice: Subject to any disclaimer, the term of this patent is extended or adjusted under 35 U.S.C. 154(b) by 156 days.

(21) Appl. No.: 16/790,252

(22) Filed: Feb. 13, 2020

(65) Prior Publication Data
US 2020/0262376 A1 Aug. 20, 2020

(30) Foreign Application Priority Data
Feb. 15, 2019 (JP) .............................. JP2019-026011

(51) Int. Cl.
*B60R 19/48* (2006.01)
*B60R 19/02* (2006.01)

(52) U.S. Cl.
CPC .......... *B60R 19/483* (2013.01); *B60R 19/023* (2013.01)

(58) Field of Classification Search
CPC ............... B60R 19/483; B60R 19/023; B60R 2019/186; B60R 2019/188; B60R 21/0136
See application file for complete search history.

(56) References Cited

U.S. PATENT DOCUMENTS

| 3,794,997 A * | 2/1974 | Iwatsuki | B60R 21/013 342/72 |
| 2009/0038403 A1* | 2/2009 | Kamei | G01L 1/16 73/774 |
| 2009/0322107 A1* | 12/2009 | Takahashi | B60R 21/0136 293/121 |
| 2013/0127190 A1* | 5/2013 | Shamoto | B60R 21/0136 293/117 |

(Continued)

FOREIGN PATENT DOCUMENTS

| JP | H10-79580 A | 3/1998 |
| JP | 2018-054583 A | 4/2018 |

(Continued)

OTHER PUBLICATIONS

Office Action received in corresponding Japanese application No. 2019-026011 dated Oct. 20, 2020 with English translation (8 pages).

*Primary Examiner* — Gregory A Blankenship
(74) *Attorney, Agent, or Firm* — Rankin, Hill & Clark LLP

(57) ABSTRACT

A sensor attachment structure includes an energy absorption member, a sensor attachment portion provided to the energy absorption member and configured to attach a sensor case that houses a pressure sensor, and a cover that defines a space to house the sensor case between the cover and the sensor attachment portion. The sensor case is attached to the sensor attachment portion by locking. At least one of the sensor case, the sensor attachment portion, and the cover includes a fall preventing structure that prevents the sensor case from falling off an opening formed by the sensor attachment portion and the cover.

11 Claims, 10 Drawing Sheets

(56) References Cited

U.S. PATENT DOCUMENTS

| | | | |
|---|---|---|---|
| 2014/0036632 A1* | 2/2014 | Suyama | B60R 19/483 367/99 |
| 2015/0114746 A1* | 4/2015 | Nickel | B60R 13/04 180/274 |
| 2020/0262370 A1* | 8/2020 | Aizawa | B60R 19/483 |
| 2020/0262376 A1* | 8/2020 | Aizawa | B60R 19/483 |
| 2020/0276952 A1* | 9/2020 | Aizawa | B60R 21/0136 |
| 2021/0094495 A1* | 4/2021 | Park | B60R 19/18 |
| 2021/0265771 A1* | 8/2021 | Kawashima | G01S 7/521 |

FOREIGN PATENT DOCUMENTS

| | | |
|---|---|---|
| JP | 2019-201979 A | 11/2019 |
| WO | 2019-225578 | 11/2019 |

* cited by examiner

SENSOR ATTACHMENT STRUCTURE AND ENERGY ABSORPTION STRUCTURE

CROSS-REFERENCE TO RELATED APPLICATION

This application is based upon and claims priority from the Japanese Patent Application No. 2019-026011, filed on Feb. 15, 2019, the entire contents of which are incorporated herein by reference.

BACKGROUND OF THE INVENTION

1. Field of the Invention

The present invention relates to a sensor attachment structure and an energy absorption structure.

2. Description of the Related Art

Japanese Patent Application Publication No. Hei 10-79580 discloses a concept of using screws for fixing an object (a panel) to a body made of a resin.

Here, in the case of involving the resin in particular, the screws used for fixation are prone to fall off due to vibration because the resin is fragile and loosening torque applied to the resin tends to be smaller than fastening torque applied thereto.

SUMMARY OF THE INVENTION

The present invention has been made in view of the aforementioned circumstance. An object of the present invention is to provide a sensor attachment structure and an energy absorption structure, which are capable of preventing a sensor case from falling off due to vibration.

To solve the aforementioned problem, a sensor attachment structure of the present invention includes a panel body, a sensor attachment portion provided to the panel body and configured to attach a sensor case that houses a sensor, and a cover that defines a space to house the sensor case between the cover and the sensor attachment portion. The sensor case is attached to the sensor attachment portion by locking. Moreover, at least one of the sensor case, the sensor attachment portion, and the cover includes a fall preventing structure that prevents the sensor case from falling off an opening formed by the sensor attachment portion and the cover.

According to the present invention, the sensor case is attached to the sensor attachment portion of the panel body by means of locking without using screws. Accordingly, it is possible to prevent the sensor case from falling off due to vibration. In addition, since the fall preventing structure is provided, the sensor case can be prevented from falling off the opening even when a locking region ceases to function due to a breakage or the like.

DETAILED DESCRIPTION OF THE EMBODIMENTS

Regarding an embodiment of the present invention, a sensor attachment structure of the present invention will be described below in detail with reference to the accompanying drawings while taking a case of applying a pressure sensor for detecting a collision with a pedestrian to a front bumper of a vehicle as an example. In the following description, the same constituents will be denoted by the same reference signs and overlapping explanations thereof will be omitted. Moreover, expressions representing directions such as front, rear, up, down, right, and left will be based on an occupant of a vehicle.

Figure 1:
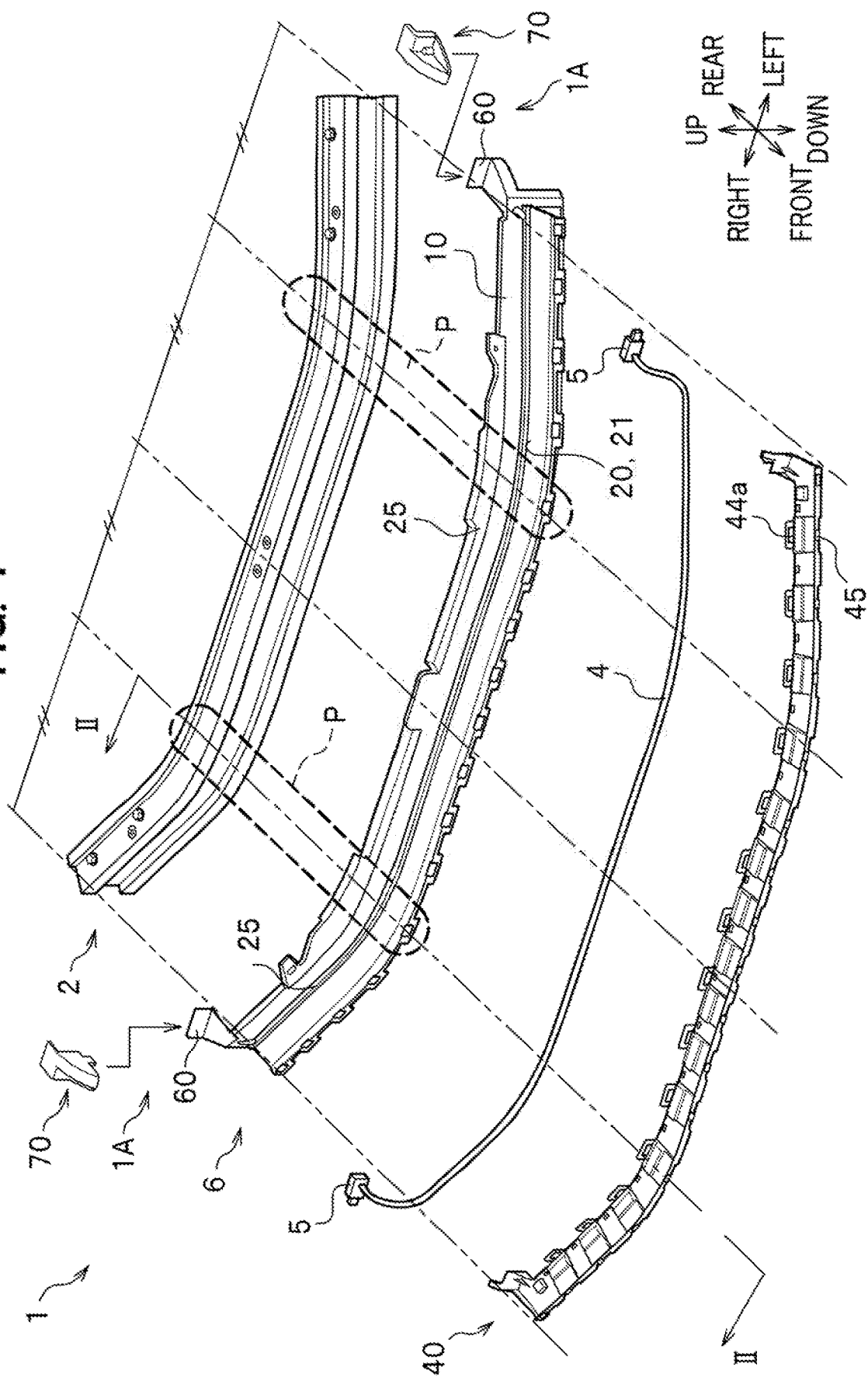
FIG. 1 is an exploded perspective view schematically showing a vehicle front part structure according to an embodiment of the present invention.
Figure 2:
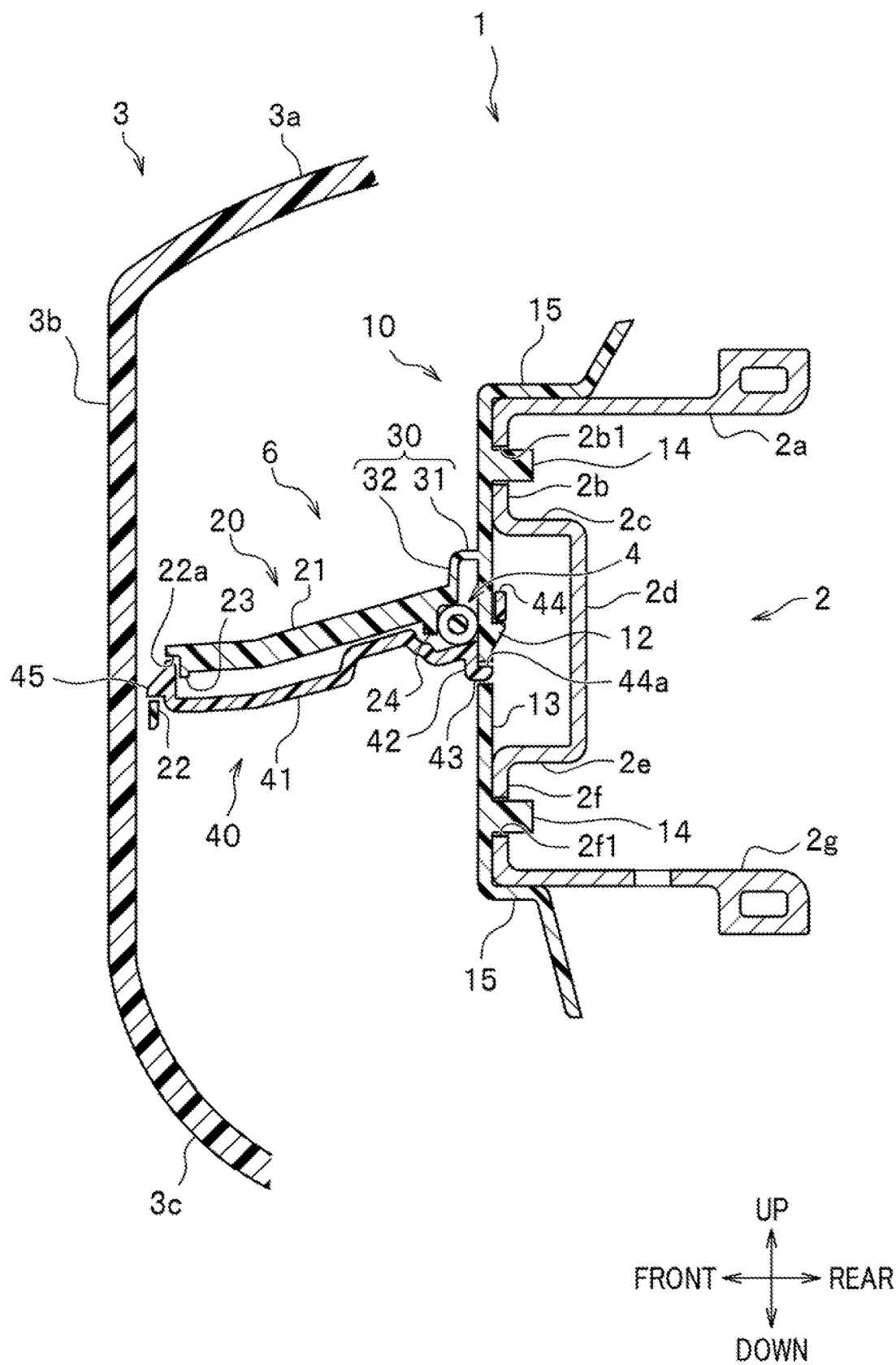
FIG. 2 is a cross-sectional view taken along the II-II line, which schematically shows the vehicle front part structure according to the embodiment of the present invention.

As shown in FIG. 1, a vehicle front part structure 1 according to an embodiment of the present invention is a structure designed to absorb collision energy in case a colliding object (such as a pedestrian) collides against a front part of a vehicle, for example, and also to detect the collision. As shown in FIGS. 1 and 2, the vehicle front part structure 1 is provided between a bumper beam 2 and a bumper face 3 of the vehicle front part, and includes a pressure generation tube 4 that extends in a vehicle width direction, a pair of right and left pressure sensors 5 connected to the pressure generation tube 4, an energy absorption member 6, and a reinforcement member 40. Here, the vehicle front part structure 1 includes a first energy absorption structure and a second energy absorption structure collectively as a structure for absorbing collision energy in case a colliding object (such as a pedestrian) collides against the front part of the vehicle, for example. The first energy absorption structure includes the energy absorption member 6 and the bumper beam 2 and prevents a displacement in an up-down direction of these components. The second energy absorption structure includes the energy absorption member 6 and the reinforcement member 40 and increases an amount of energy absorption by using the reinforcement member 40. Moreover, the second energy absorption structure also includes the pressure generation tube 4 and the pressure sensors 5 and detects a collision. Here, the second energy absorption structure further includes sensor attachment structures 1A to be described later.

<Bumper Beam>

The bumper beam 2 is a metallic component that extends in the vehicle width direction at the vehicle front part. The bumper beam 2 takes on an arch shape that projects forward in plan view. Specifically, the bumper beam 2 takes on such a shape that its central part in the vehicle width direction is located foremost and its two end parts in the vehicle width direction gradually set back. The two end parts in the vehicle width direction of the bumper beam 2 are connected to a framework member (a front side member) of the vehicle that extends in a front-rear direction on a rear side of the bumper beam 2. In case of a collision (a front collision) of the vehicle, the bumper beam 2 transmits a collision load (energy) inputted to the bumper beam to the framework member.

As shown in FIG. 2, the bumper beam 2 includes an upper wall portion 2a that extends in the front-rear direction, a front wall portion 2b that extends downward from a front end part of the upper wall portion 2a, and an intermediate upper wall portion 2c that extends rearward from a lower end part of the front wall portion 2b, which are integrated together in lateral view. Moreover, the bumper beam 2 includes an intermediate front wall portion 2d that extends downward from a rear end part of the intermediate upper wall portion 2c, an intermediate lower wall portion 2e that extends forward from a lower end part of the intermediate front wall portion 2d, a front wall portion 2f that extends downward from a front end part of the intermediate lower wall portion 2e, and a lower wall portion 2g that extends rearward from a lower end part of the front wall portion 2f, which are integrated together in lateral view.

Specifically, a concave portion is formed in a front surface of the bumper beam 2 by using the intermediate upper wall portion 2c, the intermediate front wall portion 2d, and the intermediate lower wall portion 2e. The pressure generation tube 4 as well as a tube compressing portion 20 and the reinforcement member 40 of the energy absorption member 6 to be described later are located in front of this concave portion so as to facilitate assembly and disassembly thereof. Meanwhile, hole portions 2b1 and 2f1 are formed in the upper and lower front wall portions 2b and 2f, respectively.

<Bumper Face>

The bumper face 3 is either a resin component or a metallic component which is provided in front of the bumper beam 2 and constitutes an external surface (a design surface) of the vehicle. The bumper face 3 includes an upper wall portion 3a that extends in the front-rear direction, a front wall portion 3b that extends downward from a front end part of the upper wall portion 3a, and a lower wall portion 3c that extends rearward from a lower end part of the front wall portion 3b, which are integrated together in lateral view.

<Pressure Generation Tube>

The pressure generation tube 4 extends in the vehicle width direction between the bumper beam 2 and the bumper face 3. The pressure generation tube 4 is a flexible resin component which generates a pressure in a fluid (such as air) inside when the pressure generation tube 4 is compressed and squashed by a load.

<Pressure Sensor>

As shown in FIG. 1, the pair of right and left pressure sensors 5 are connected to the two end parts of the pressure generation tube 4, respectively. Each pressure sensor 5 detects the pressure of the internal fluid generated by a squash deformation of the pressure generation tube 4 and outputs a detection result to a control unit (not shown). The control unit executes control for protecting the colliding object (such as a pedestrian) by lifting up a hood on an engine room provided at the front part of the vehicle, for instance, based on the detection results of the pair of right and left pressure sensors 5.

<Energy Absorption Member>

The energy absorption member 6 is a resin component (made of polypropylene (PP), for example) provided between the bumper beam 2 and bumper face 3. The energy absorption member 6 is formed by injection molding, for instance, and is rigid enough for not causing a delay in detecting a collision. In case of a collision (a front collision) of the vehicle, the energy absorption member 6 absorbs a front collision load (energy) and compresses the pressure generation tube 4 so as to apply the pressure to the fluid inside the pressure generation tube 4. As shown in FIG. 2, the energy absorption member 6 includes a rear wall portion 10, the tube compressing portion 20, and a hinge portion 30, which are integrated together.

<<Rear Wall Portion>>

Figure 3:
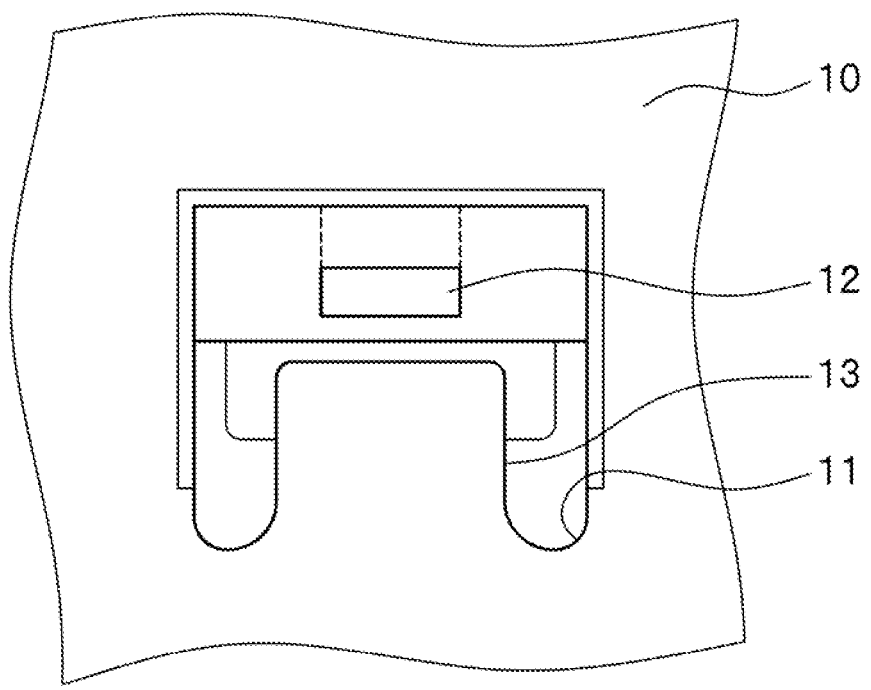
FIG. 3 is a rear view schematically showing a rear wall portion.
Figure 3:
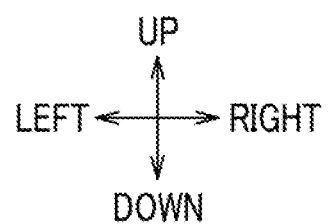

The rear wall portion 10 is an elongated plate portion which is located behind the pressure generation tube 4 and extends in the up-down direction and a right-left direction (that is, extends in a direction of a frontal plane). As shown in FIG. 1, the rear wall portion 10 takes on an arch shape that projects forward in plan view in such a way as to extend along the bumper beam 2. Specifically, the rear wall portion 10 takes on such a shape that its central part in the vehicle width direction is located foremost and its two end parts in the vehicle width direction gradually set back. As shown in FIG. 3, combinations each including a hole portion 11 that takes on a rectangular shape, a lock portion 12 that extends downward from an upper edge part of the hole portion 11, and a fall preventing portion 13 that extends upward from a lower edge part of the hole portion 11, are formed in arrangement in the vehicle width direction on the rear wall portion 10. The lock portion 12 takes on a claw shape that can be locked with a peripheral part of a hole portion 44a to be described later. The fall preventing portion 13 takes on a tongue-piece shape that extends upward from an intermediate part while leaving spaces at two ends of the lower edge part of the hole portion 11.

As shown in FIG. 2, pairs of upper and lower projections 14 are formed on the rear wall portion 10. Each projection 14 projects rearward from the rear wall portion 10. The upper projection 14 is inserted into the hole portion 2b1 formed in the front wall portion 2b of the bumper beam 2. The lower projection 14 is inserted into the hole portion 2f1 formed in the front wall portion 2f of the bumper beam 2. Of a combination of a dimension in the up-down direction of the upper projection 14 and a dimension in the up-down direction of the corresponding hole portion 2b1 and a combination of a dimension in the up-down direction of the lower projection 14 and a dimension in the up-down direction of the corresponding hole portion 2f1, at least one of the combinations has the equal dimensions in the up-down direction.

The set of the projection 14 and the hole portion 2b1 (or the hole portion 2f1) is provided between the central part in the vehicle width direction and the corresponding end part in the vehicle width direction of the bumper beam 2, and functions as a vertical displacement preventing portion that prevents a displacement between the energy absorption member 6 and the bumper beam 2 in the up-down direction. Moreover, the set of the projection 14 and the hole portion 2b1 (or the hole portion 2f1) also functions as a positioning portion that positions the energy absorption member 6 relative to the bumper beam 2 at the time of attaching the energy absorption member 6 to the bumper beam 2.

In this embodiment, the projection 14 and the hole portion 2b1 (or the hole portion 2f1) collectively serving as the vertical displacement preventing portion are provided in a region P (see FIG. 1) located at a distance of about ¼ of the dimension in the vehicle width direction of the bumper beam 2 away from the end part in the vehicle width direction thereof. This location is a location where the bumper beam 2 does not set back even in case of a collision when a load is concentrated on the central part of the bumper beam 2. Accordingly, no gap in the vehicle front-rear direction develops between the bumper beam 2 and the energy absorption member 6. The bumper beam 2 and the energy absorption member 6 are relatively greatly curved in the vicinity of the region P. The first energy absorption structure in the vehicle front part structure 1 includes the vertical displacement preventing portion in each region P and can therefore properly prevent the displacement of the energy absorption member 6 in the up-down direction relative to the bumper beam 2, thereby appropriately absorbing the collision load (energy).

A pair of upper and lower flange portions 15 are formed on the rear wall portion 10. The upper flange portion 15 extends rearward from an upper edge part of the rear wall portion 10 and is located above the upper wall portion 2a of the bumper beam 2. The lower flange portion 15 extends rearward from a lower edge part of the rear wall portion 10 and is located below the lower wall portion 2g of the bumper beam 2.

The lower flange portion 15 comes into contact with a lower surface of the bumper beam 2, that is, the lower wall portion 2g at a portion (at least in the region P in this embodiment) between the central part in the vehicle width direction and the end part in the vehicle width direction of the bumper beam 2. As described above, each flange portion 15 functions as another vertical displacement preventing portion that prevents the displacement between the energy absorption member 6 and the bumper beam 2 in the up-down direction. The flange portion 15 also functions as a reinforcing portion that reinforces the rear wall portion 10.

The upper flange portion 15 and the upper wall portion 2a of the bumper beam 2 are fixed to each other between the end part in the vehicle width direction of the bumper beam 2 and the hole portion 2b1 on the end part side by means of bolt fastening and the like.

Likewise, the lower flange portion 15 and the lower wall portion 2g of the bumper beam 2 are fixed to each other between the end part in the vehicle width direction of the bumper beam 2 and the hole portion 2f1 on the end part side by means of bolt fastening and the like.

<<Tube Compressing Portion>>

As shown in FIG. 2, the tube compressing portion 20 is a region located in front of the pressure generation tube 4 and configured not to compress the pressure generation tube 4 in normal times and to compress the pressure generation tube 4 in cooperation with the rear wall portion 10 in case of a collision (a front collision) of the vehicle. The tube compressing portion 20 includes an extension wall portion 21 that extends in the front-rear direction, a front wall portion 22 that extends downward from a front end part of the extension wall portion 21, an opposite wall portion 23 that extends downward from the vicinity of the front end part of the extension wall portion 21 in such a way as to be opposed to the front wall portion 22, and a compressing wall portion 24 that extends downward from the vicinity of a rear end part of the extension wall portion 21, which are integrated together. The extension wall portion 21 extends from a constant height position across the entire rear wall portion 10 in the vehicle width direction, and takes on an arch shape that projects forward in plan view as with the rear wall portion 10. Specifically, the extension wall portion 21 takes on such a shape that its central part in the vehicle width direction is located foremost and its two end parts in the vehicle width direction gradually set back.

Figure 4:
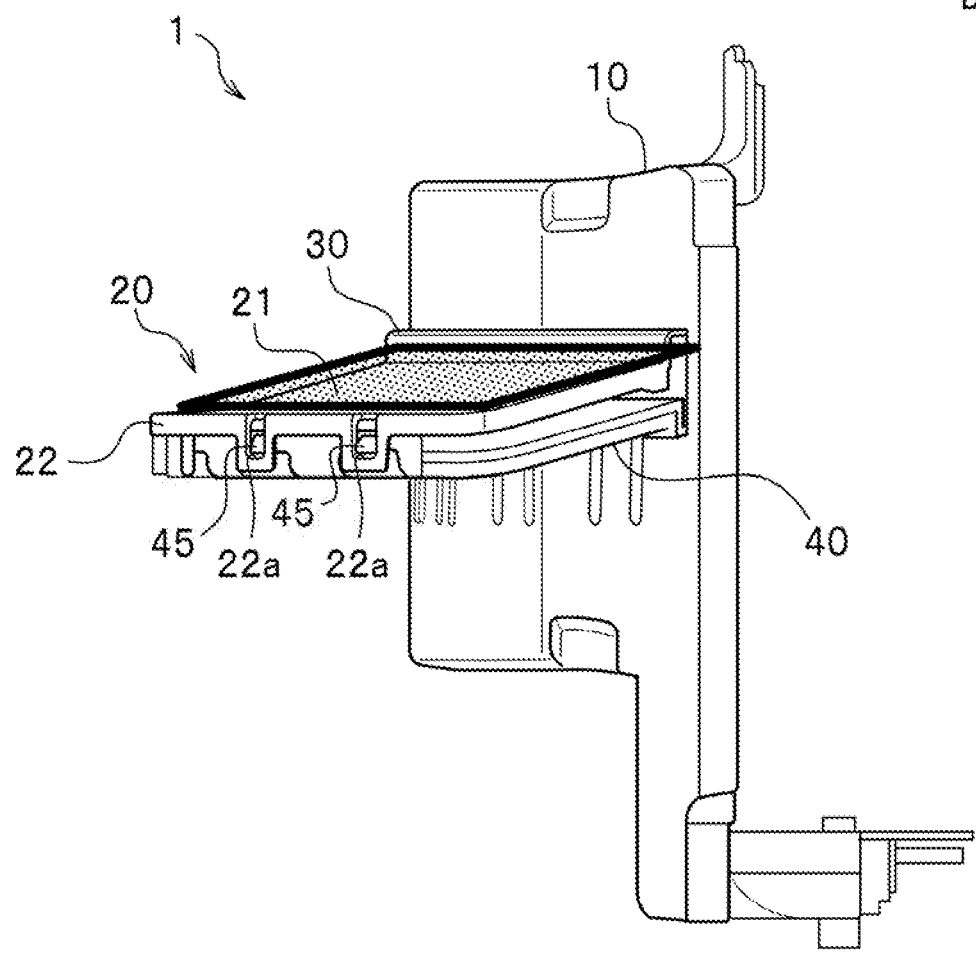
FIG. 4 is a side view schematically showing an assembly of an energy absorption member and a reinforcement member.

In this embodiment, the extension wall portion 21 is an elongated plate portion which is inclined downward toward the front. Specifically, the front end part (an apical end part) of the extension wall portion 21 is located below the rear end part (a base end part) of the extension wall portion 21. That is to say, the front end part of the extension wall portion 21 is offset toward the pressure generation tube 4 in the up-down direction relative to the base end part of the extension wall portion 21. Meanwhile, the extension wall portion 21 is formed in a bent manner in such a way as to project downward in lateral view. Since the extension wall portion 21 extends obliquely downward from the rear wall portion 10 which takes on the arch shape that projects forward in plan view as described above, the contour (which is highlighted with a thick frame) of the extension wall portion 21 takes on a substantially parallelogram shape in lateral view as illustrated in FIG. 4.

As shown in FIG. 2, the front wall portion 22 is provided with a hole portion 22a. A lock portion 45 of the reinforcement member 40 to be described later is locked with a peripheral part of the hole portion 22a. A length (a dimension in the up-down direction) of the opposite wall portion 23 is set shorter than that of the front wall portion 22. The lock portion 45 of the reinforcement member 40 to be described later comes into contact with this opposite wall portion 23. The compressing wall portion 24 is provided at a position away by the diameter of the pressure generation tube 4 from the rear wall portion 10.

<<Hinge Portion>>

The hinge portion 30 connects the rear end part (the base end part of the extension wall portion 21 of the tube compressing portion 20 turnably to the rear wall portion 10 at a position above the pressure generation tube 4. The hinge portion 30 includes an upper wall portion (a first wall portion) 31 that extends forward from the rear wall portion 10 and a front wall portion (a second wall portion) 32 that extends downward from a front end part of the upper wall portion 31, which are integrated together. A lower end part of the front wall portion 32 is connected to the rear end part of the extension wall portion 21 of the tube compressing portion 20.

<Reinforcement Member>

The reinforcement member 40 is a resin member (made of polypropylene (PP), for example), which is provided in such a way as to face the extension wall portion 21 of the tube compressing portion 20 and designed to hold the pressure generation tube 4 in cooperation with the extension wall portion 21. The reinforcement member 40 is formed by injection molding, for instance, and is rigid enough for not causing a delay in detecting a collision as with the tube compressing portion 20. The reinforcement member 40 includes an extension wall portion 41 that extends in the front-rear direction, an intermediate piece portion 42 that extends downward from a lower end part of the extension wall portion 41, a lower piece portion 43 that extends rearward from a lower end part of the intermediate piece portion 42, a rear piece portion 44 that extends upward from a rear end part of the lower piece portion 43, and the lock portion 45 that extends upward from a front end part of the extension wall portion 41, which are integrated together.

The intermediate piece portion 42 and the lower piece portion 43 collectively serve as a hinge portion for the extension wall portion 41 having a similar function to that of the hinge portion 30. The hole portion 44a that takes on a rectangular shape is formed in the rear piece portion 44. The lock portion 12 of the rear wall portion 10 is locked with the peripheral part of the hole portion 44a. Specifically, the reinforcement member 40 is locked with a rear side of the rear wall portion 10 on a front side of the concave portion (inside the concave portion) of the bumper beam 2. The lock portion 45 takes on a claw shape which is lockable with the peripheral part of the hole portion 22a.

<Attachment of Reinforcement Member to Energy Absorption Member>

A worker attaches the reinforcement member 40 to the energy absorption member 6 while locating the pressure generation tube 4 between the rear wall portion 10 and the compressing wall portion 24 of the energy absorption member 6. Here, the worker inserts the rear piece portion 44 of the reinforcement member 40 into the hole portion 11 of the rear wall portion 10 from forward and locks the lock portion 12 of the rear wall portion 10 with the hole portion 44a of the rear piece portion 44. Likewise, the worker brings the lock portion 45 of the reinforcement member 40 into contact with the opposite wall portion 23 and locks the lock portion 45 with the hole portion 22a of the front wall portion 22.

Here, when the rear piece portion 44 is inserted into the hole portion 11, the fall preventing portion 13 is elastically deformed in such a way as to set back, thereby allowing the insertion of the rear piece portion 44 into the hole portion 11. Meanwhile, after the lock portion 12 is locked with the hole portion 44a, the fall preventing portion 13 prevents the rear piece portion 44 from falling off the rear wall portion 10.

<Attachment of Energy Absorption Member to Bumper Beam>

Subsequently, the worker attaches an assembly of the pressure generation tube 4, the energy absorption member 6, and the reinforcement member 40 to the bumper beam 2. Here, the worker establishes positioning of the energy absorption member 6 relative to the bumper beam 2 by inserting the projections 14 of the energy absorption member 6 into the hole portions 2b1 and 2f1 of the bumper beam 2. Then, the worker fixes the positioned bumper beam 2 and the positioned energy absorption member 6 to each other by means of bolt fastening and the like.

<Compression of Pressure Generation Tube in Case of Collision>

Figure 5:
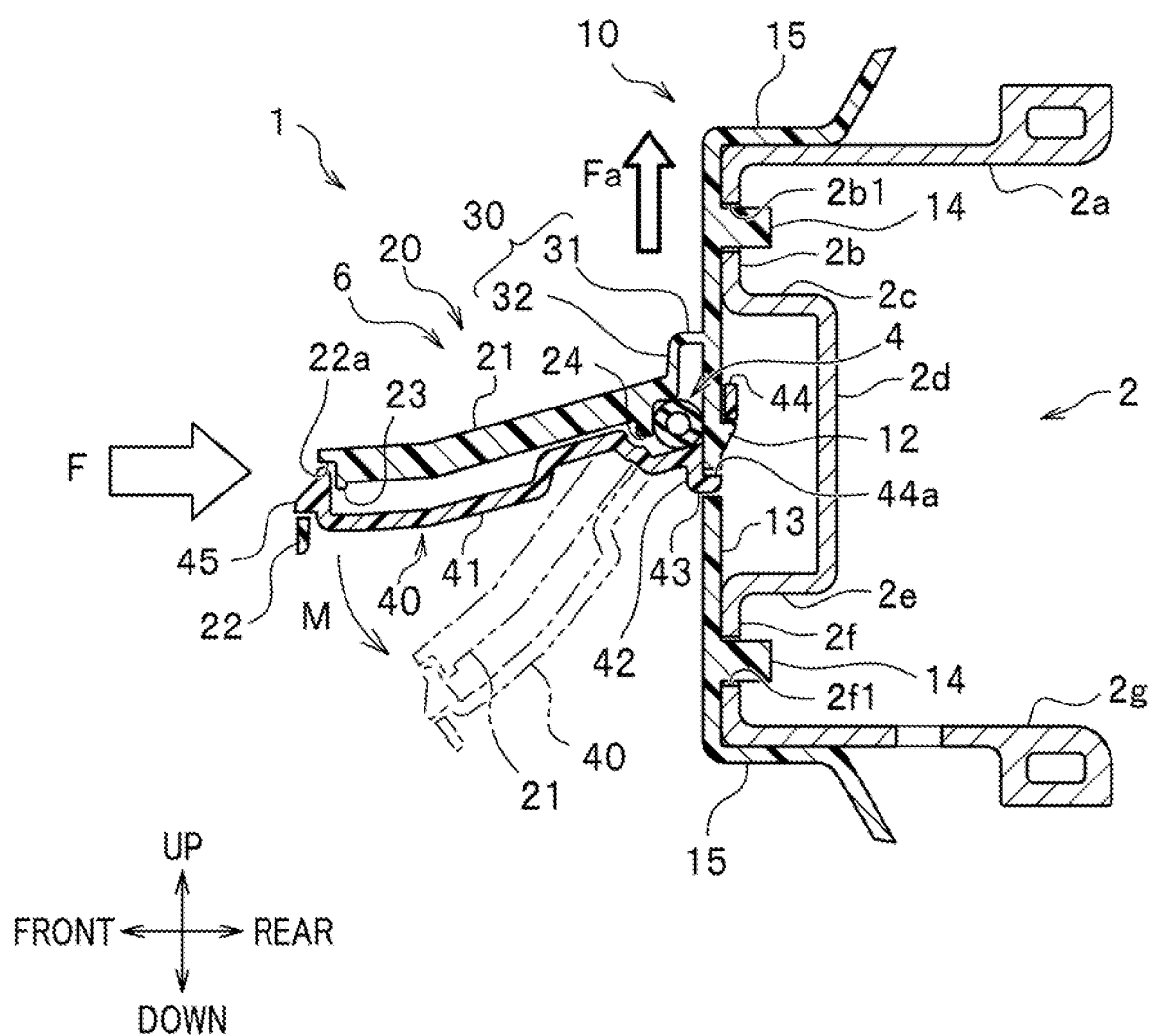
FIG. 5 is a cross-sectional view schematically showing an operation example of a second energy absorption structure according to the embodiment of the present invention.

As shown in FIG. 5, a front collision load F acts on the extension wall portion 21 of the tube compressing portion 20 in case of a collision (a front collision) of the vehicle as a downward turning moment M around the hinge portion 30 (a region of connection between the upper wall portion 31 and the front wall portion 32 in particular). Likewise, the front collision load F acts on the extension wall portion 41 of the reinforcement member 40 as a downward turning moment M around the base end part of the extension wall portion 41 (a region of connection between the extension wall portion 41 and the intermediate piece portion 42). By using these moments M, the compressing wall portion 24 of the tube compressing portion 20 interposes the pressure generation tube 4 between the compressing wall portion 24 and the rear wall portion 10 and compresses the pressure generation tube 4 rearward in such a way as to squash the pressure generation tube 4. In the meantime, the extension wall portion 41 having a contour that takes on a substantially parallelogram shape in lateral view develops an out-of-plane deformation due to the front collision load F.

Here, a length in the front-rear direction of the extension wall portion 41 of the reinforcement member 40 is set larger than a length in the front-rear direction of the extension wall portion 21 of the tube compressing portion 20. Meanwhile, the region of connection between the upper wall portion 31 and the front wall portion 32 serves as the center of rotation of the extension wall portion 21 while the region of connection between the extension wall portion 41 and the intermediate piece portion 42 serves as the center of rotation of the extension wall portion 41. The center of rotation of the extension wall portion 41 is located immediately below the pressure generation tube 4 and behind the center of rotation of the extension wall portion 21. For this reason, when the extension wall portions 21 and 41 are turned downward, the front end parts of the extension wall portions 21 and 41 come close to each other. Thus, the extension wall portions 21 and 41 can be prevented from being unlocked. Moreover, since the lock portion 45 is locked with the front wall portion 22 from behind, the reinforcement member 40 has a structure that is less likely to be detached from the extension wall portion 21 when the extension wall portion 21 is deformed in a turned manner.

In the meantime, an upward force Fa acts on the rear wall portion 10 when the extension wall portion 21 is turned downward. Here, the lower flange portion 15 is in contact from below with the lower wall portion 2g of the bumper beam 2, thus functioning as the vertical displacement preventing portion that prevents the energy absorption member 6 from being displaced in the up-down direction from the bumper beam 2.

Figure 6:
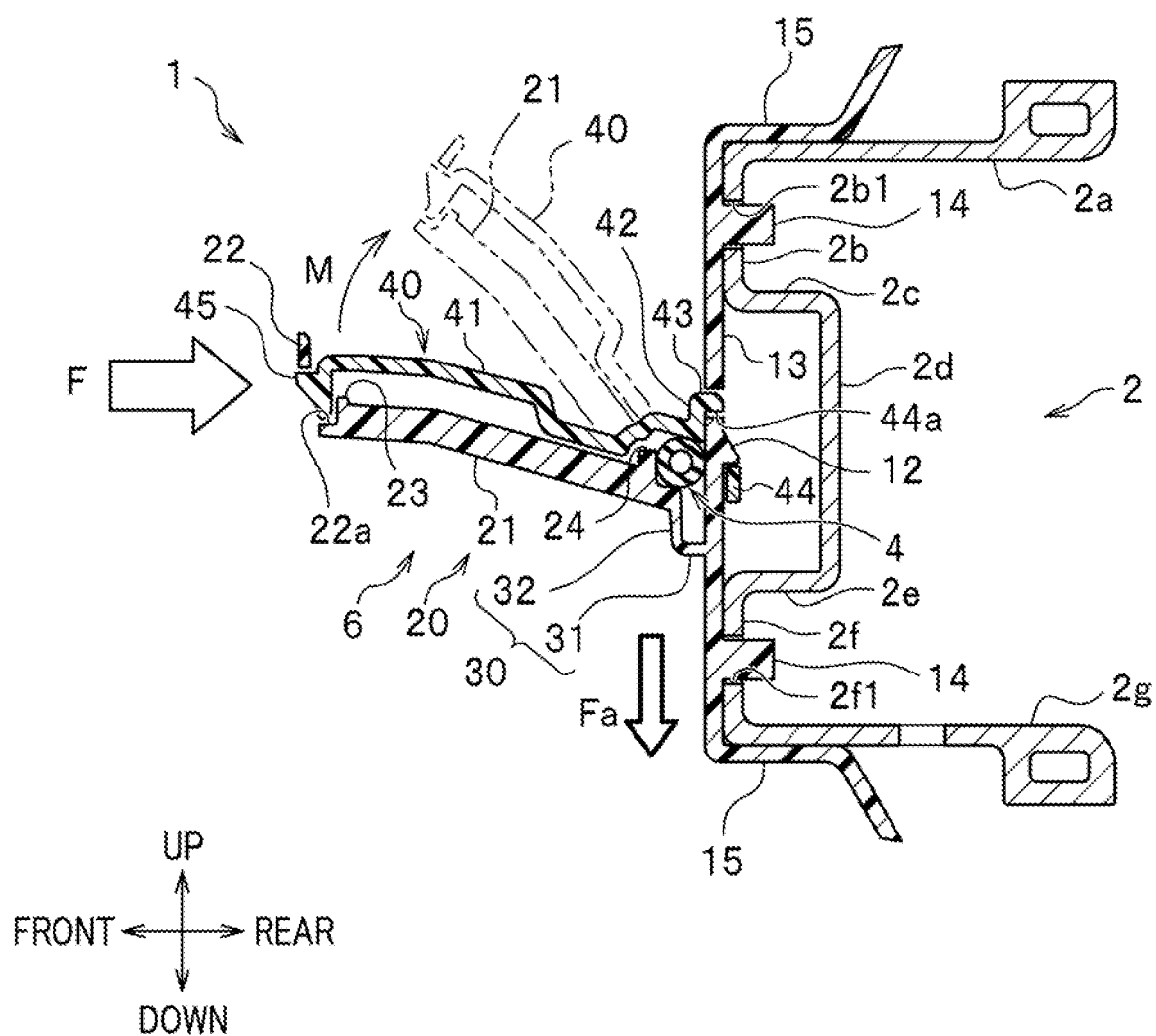
FIG. 6 is a cross-sectional view schematically showing another operation example of the second energy absorption structure according to the embodiment of the present invention.

Note that the first energy absorption structure in the vehicle front part structure 1 may have such a structure that the energy absorption member 6 and the reinforcement member 40 are turned upside down as shown in FIG. 6. In this case, a downward force Fa acts on the rear wall portion 10 when the extension wall portion 21 is turned upward. Here, the upper flange portion 15 is in contact from above with the upper wall portion 2a of the bumper beam 2, thus functioning as the vertical displacement preventing portion that prevents the energy absorption member 6 from being displaced in the up-down direction from the bumper beam 2.

<Sensor Attachment Structure>

Figure 7:
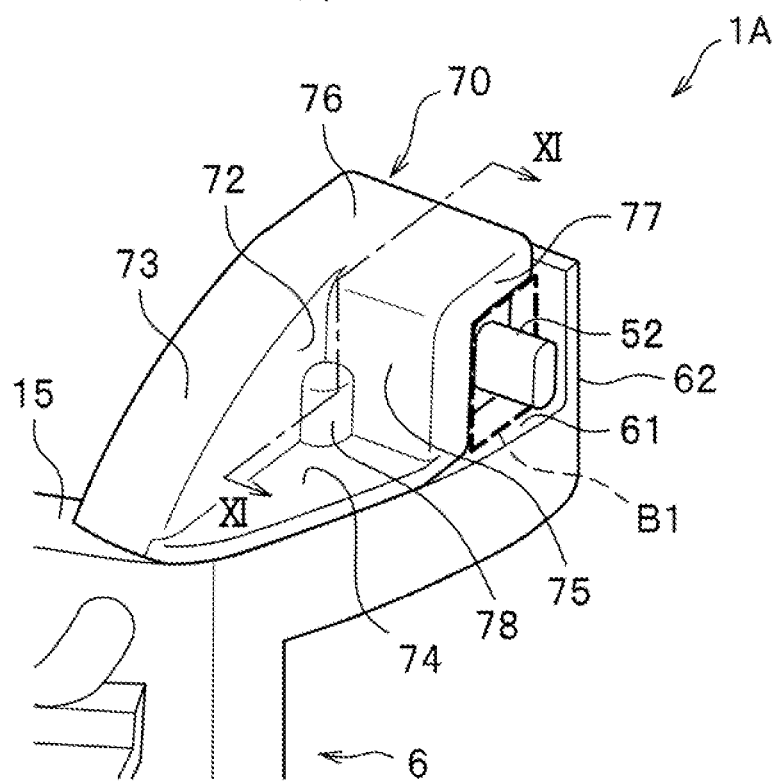
FIG. 7 is a perspective view schematically showing a sensor attachment structure according to the embodiment of the present invention.
Figure 7:
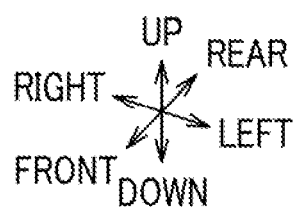
Figure 8:
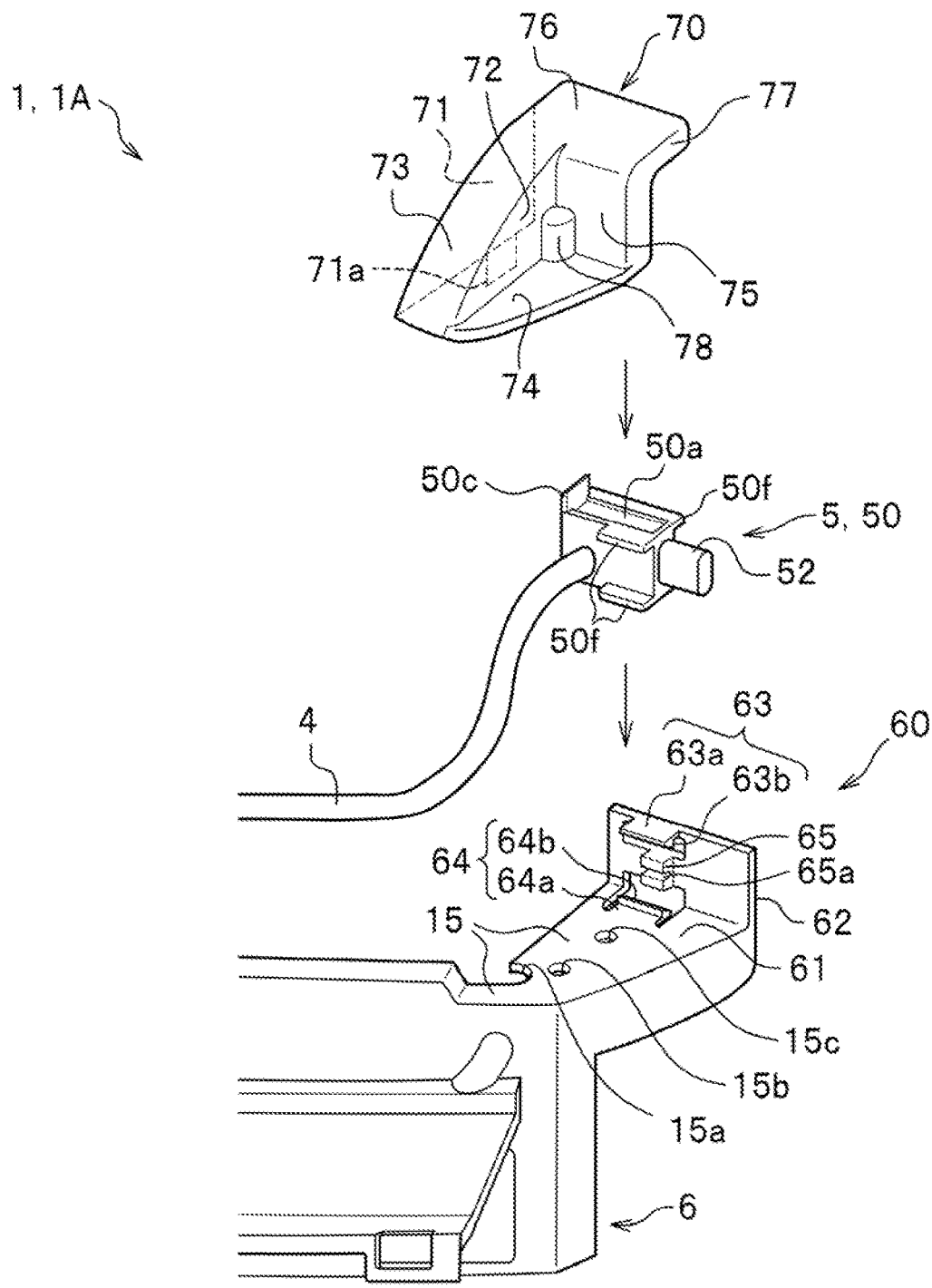
FIG. 8 is an exploded perspective view schematically showing the sensor attachment structure according to the embodiment of the present invention.
Figure 8:
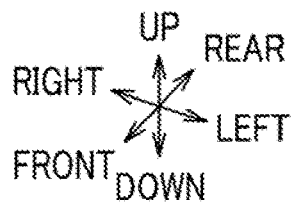

Next, a sensor attachment structure according to the embodiment of the present invention will be described. As shown in FIGS. 7 and 8, an energy absorption structure 1 includes a sensor attachment portion 60 provided to the energy absorption member 6 being a panel body, and a cover 70, collectively serving as a sensor attachment structure 1A to which a sensor case 50 is attached. Note that the energy absorption structure 1 includes a pair of right and left sensor attachment structures 1A. Since the pair of right and left sensor attachment structures 1A have bilaterally symmetrical structures, the following description will explain the sensor attachment structure 1A on the left side as an example.

<Sensor Case>

As shown in FIG. 8, the sensor case 50 is a resin housing to contain a body section of the pressure sensor 5. A coupling portion 51 (see FIG. 9) that can be coupled to the end part of the pressure generation tube 4 is provided on a front surface of the sensor case 50. An engagement portion 52 that can be engaged with a connector is provided on an outer side surface in the vehicle width direction of the sensor case 50. This engagement portion 52 projects to the outside of a space defined by the sensor case 50 and the sensor attachment portion 60 via an opening B1 to be described later.

A concave portion 50a is formed on an upper surface of the sensor case 50. A concave portion 50b (see FIG. 11) is formed on a lower surface of the sensor case 50. A flange portion 50c that projects upward and downward is provided to an inner side surface in the vehicle width direction of the sensor case 50. A concave portion 50d (see FIG. 11) having a rectangular shape in rear view is formed on a rear surface of the sensor case 50, and a convex portion 50e (see FIG. 11) projecting rearward inside the concave portion 50d is formed on a bottom surface of the concave portion 50d. The convex portion 50e is formed in such a way as to connect two edge portions in the vehicle width direction of the rectangular concave portion 50d, and the concave portion 50d is vertically partitioned by the convex portion 50e.

Meanwhile, flange portions 50f that project forward are formed on upper and lower end parts of the front surface of the sensor case 50, and flange portions 50f that project rearward are formed on upper and lower end parts of the rear surface of the sensor case 50.

<Sensor Attachment Portion>

The sensor attachment portion 60 is a region to which the pressure sensor 5, or more specifically, the sensor case 50 to house the pressure sensor 5 is attached. The sensor attachment portion 60 is made of a resin material and formed integrally with the energy absorption member 6. The sensor attachment portion 60 includes a bottom wall portion 61 that extends rearward from an end part in the vehicle width direction of the upper flange portion 15 of the energy absorption member 6, a rear wall portion 62 that extends upward from a rear end part of the bottom wall portion 61, an upper lock portion 63 that extends forward from an upper end part of the rear wall portion 62, and a lower lock portion 64 provided to the bottom wall portion 61.

Figure 11:
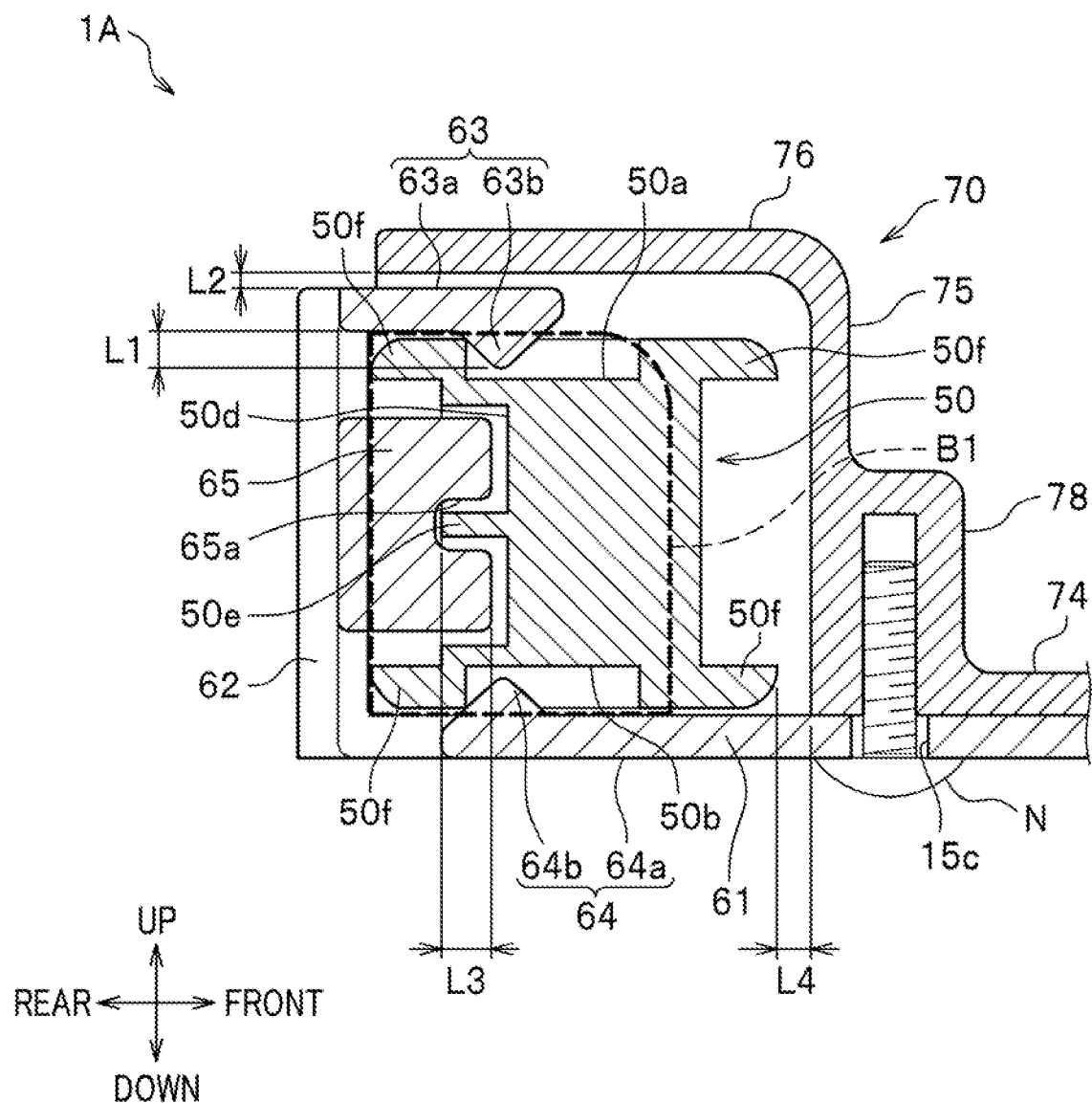
FIG. 11 is a cross-sectional view taken along the XI-XI line in FIG. 7.

As shown in FIG. 11, the upper lock portion 63 includes a slip portion 63a that extends forward from the upper end part of the rear wall portion 62 and a projecting portion 63b that projects downward from a front end part of the slip portion 63a, which are integrated together. The lock portion 63 is elastically deformable in the up-down direction pivotally about a base end part of the slip portion 63a. The lower lock portion 64 is laid out and formed on the bottom wall portion 61 by a hole portion that takes on a U-shape in plan view, and includes a slip portion 64a that extends rearward from the bottom wall portion 61 and a projecting portion 64b that projects upward from a rear end part of the slip portion 64a, which are integrated together. The lock portion 64 is elastically deformable in the up-down direction pivotally about a base end part of the slip portion 64a.

Meanwhile, the sensor attachment portion 60 includes a protruding portion 65 that protrudes forward at an intermediate part in a height direction of the rear wall portion 62 and at an intermediate part in the vehicle width direction thereof. A concave portion (a concave groove) 65a that extends in the vehicle width direction is formed at an apical end part (a front end part) of the protruding portion 65. The protruding portion 65 is provided in the vicinity of the concave portion 50a and of the lock portion 63. The protruding portion 65 protrudes in an opposite direction to a locking direction of the lock portion 63, thereby controlling a movement of the sensor case 50 in a direction to release the locked state of the lock portion 63 (toward the protruding portion 65) and enhancing the locked state between the concave portion 50a and the lock portion 63.

<Cover>

As shown in FIG. 8, the cover 70 is a resin member configured to protect the sensor case 50 by defining a space with the sensor attachment portion 60 for housing the sensor case 50. The cover 70 includes an inner wall portion 71, an outer wall portion 72, an inclined upper wall portion 73, a lower wall portion 74, a front wall portion 75, an upper wall portion 76, a flange wall portion 77, and a female screw portion 78, which are integrated together.

The inner wall portion 71 and the outer wall portion 72 are provided to face each other in the vehicle width direction, and take on a triangular shape that gradually increases its height rearward. A lock portion 71a that extends downward and being lockable with the bottom wall portion 61 is formed at a lower end part of the inner wall portion 71. The inclined upper wall portion 73 connects between upper end parts of the inner wall portion 71 and of the outer wall portion 72.

The lower wall portion 74 extends outward in the vehicle width direction from a lower end part of the outer wall portion 72. The lower wall portion 74 is provided with a projecting portion 74a (see FIG. 10) that extends downward.

The front wall portion 75 extends upward from a rear end part of the lower wall portion 74. The upper wall portion 76 extends rearward from upper end parts of the inclined upper wall portion 73 and of the front wall portion 75. The flange wall portion 77 extends rearward from an outer end part in the vehicle width direction of the front wall portion 75 and extends downward from an outer end part in the vehicle width direction of the upper wall portion 76.

The female screw portion 78 extends upward from the lower wall portion 74 at a corner portion defined by the outer wall portion 72 and the front wall portion 75.

<Attachment of Sensor Case>

Figure 9:
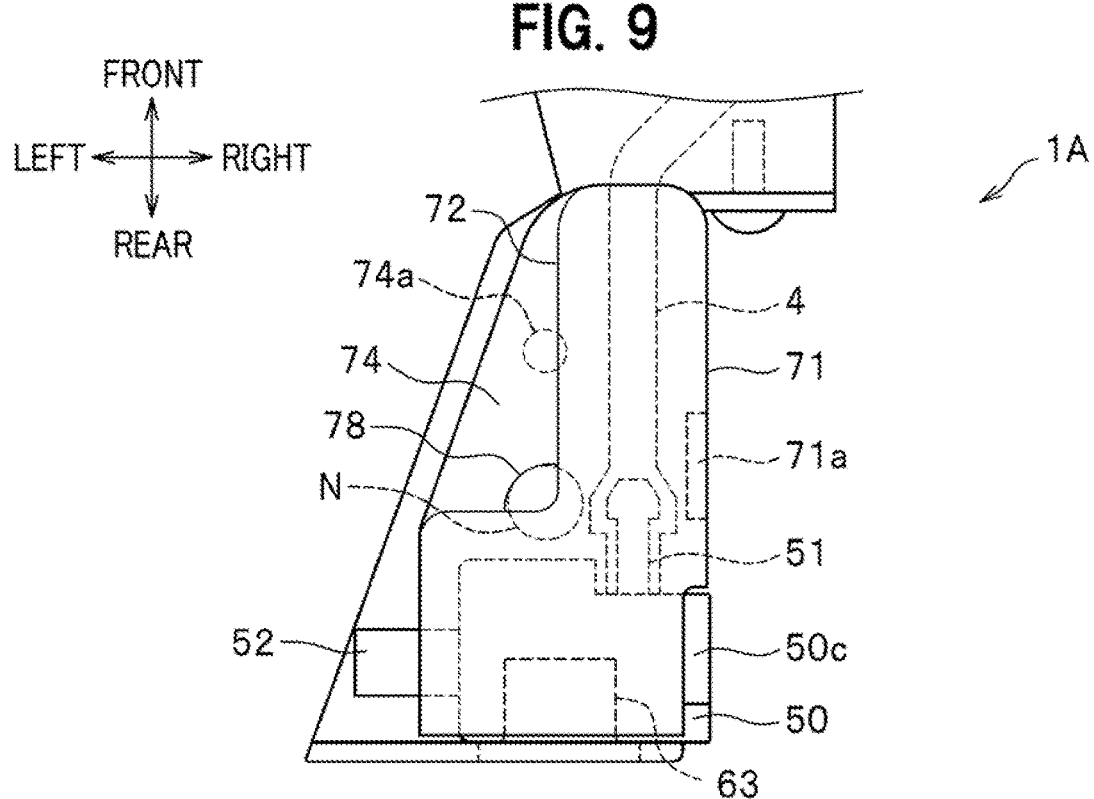
FIG. 9 is a plan view schematically showing the sensor attachment structure according to the embodiment of the present invention.
Figure 10:
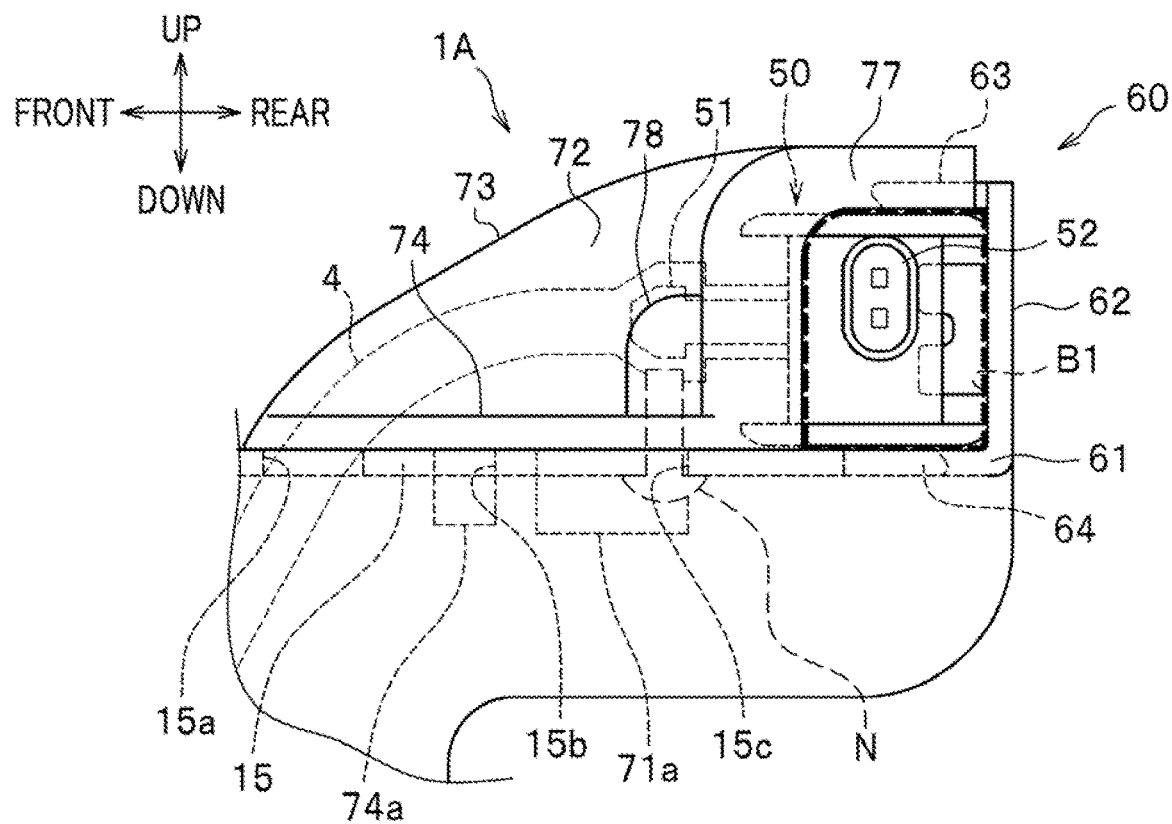
FIG. 10 is a side view schematically showing the sensor attachment structure according to the embodiment of the present invention.

As shown in FIGS. 9 to 11, the worker places the sensor case 50 on the bottom wall portion 61 in a state where the sensor case 50 is in contact with the rear wall portion 62, and installs the cover 70 above these constituents, thereby housing the sensor case 50 in the space defined by the sensor attachment portion 60 and the cover 70. Here, the end part of the pressure generation tube 4 is housed in a space defined by the flange portion 15 as well as by the inner wall portion 71, the outer wall portion 72, and the inclined upper wall portion 73 of the cover 70. Meanwhile, the sensor case 50 is housed in a space defined by the bottom wall portion 61 and the rear wall portion 62 of the sensor attachment portion 60 as well as by the front wall portion 75 and the upper wall portion 76 of the cover 70.

Here, the upper lock portion 63 locks the sensor case 50 by causing the projecting portion 63b to be inserted into the concave portion 50a and to come into contact with a side wall portion on a front side of the concave portion 50a. Meanwhile, the lower lock portion 64 locks the sensor case 50 by causing the projecting portion 64b to be inserted into the concave portion 50b and to come into contact with a side wall portion on a front side of the concave portion 50b. In this state, the sensor case 50 is locked rearward, that is, toward the rear wall portion 62 by the lock portions 63 and 64. This locking direction is substantially orthogonal to the up-down direction that is a main input direction of vibration, and can therefore properly prevent the release of the lock with the lock portions 63 and 64 due to the vibration.

Meanwhile, an insertion length L1 of the projecting portion 63b of the lock portion 63 into the concave portion 50a is set larger than a gap length L2 between an upper surface of the lock portion 63 and the upper wall portion 76 of the cover 70. For this reason, even when the lock portion 63 is deformed upward due to the vibration and the like, it is still possible to appropriately hold the sensor case 50 by preventing the projecting portion 63b from falling off the concave portion 50a.

In the meantime, the protruding portion 65 of the sensor attachment portion 60 is housed in the concave portion 50d of the sensor case 50 and the convex portion 50e of the sensor case 50 is housed in the concave portion 65a of the protruding portion 65 in a direction substantially orthogonal to the up-down direction and in a direction substantially orthogonal to an axis of the opening B1, namely, in the front-rear direction.

Meanwhile, the worker inserts the projecting portion 74a of the cover 70 into a hole portion 15b of the flange portion 15, and locks the lock portion 71a of the cover 70 with a lower surface of the bottom wall portion 61 of the sensor attachment portion 60. Here, the projecting portion 74a of the cover 70 and the hole portion 15b of the flange portion 15 collectively function as a positioning portion when attaching the cover 70. Moreover, the projecting portion 74a of the cover 70 and the hole portion 15b of the flange portion 15 also collectively function as a detachment preventing portion that prevents the cover 70 from being turned pivotally about the lock portion 71a in a direction to move away from the flange portion 15 and from the bottom wall portion 61 in a stepped diameter prior to threaded engagement with a screw N.

Subsequently, the worker inserts the screw (a tapping screw) N from below into a bore portion 15c of the flange portion 15 and brings the screw N into threaded engagement with the female screw portion 78 of the cover 70. Here, the projecting portion 74a of the cover 70 and the hole portion 15b of the flange portion 15 collectively function as a turn preventing portion that prevents the cover 70 from being turned relative to the flange portion 15 when threadedly engaging the screw N.

<Fall Preventing Structure>

Here, the opening B1 having the axis in the vehicle width direction and taking on the rectangular shape in lateral view is formed on the outer side in the vehicle width direction of the above-described sensor attachment structure 1A by using the bottom wall portion 61 and the rear wall portion 62 of the sensor attachment portion 60 as well as the flange wall portion 77 of the cover 70. This opening B1 is formed into a shape that prohibits passage of (the body portion of) the sensor case 50 such as a smaller shape than the sensor case 50 when viewed from the opening B1 side. In other words, the flange wall portion 77 functions as a fall preventing structure that prevents the sensor case 50 from coming and falling off the opening B1.

Meanwhile, an insertion length L3 of the convex portion 50e into the concave portion 65a is set larger than a gap length L4 between the front surface of the sensor case 50 and the front wall portion 75 of the sensor case 50. For this reason, even when the lock portion 63 or the like ceases to function properly due to a breakage and the like whereby the sensor case 50 becomes movable toward the front wall portion 75, the convex portion 50e, the concave portion 65a, and the front wall portion 75 collectively function as the fall preventing structure by preventing the convex portion 50e from coming off the concave portion 65a.

Moreover, the direction of insertion of the convex portion 50e into the concave portion 65a is the front-rear direction which is substantially orthogonal to the up-down direction. The above-described fall preventing structure is capable of improving assembly strength between the sensor case 50 and the sensor attachment portion 60 against the vibration in the up-down direction and thus preventing damages thereon. Accordingly, the fall preventing structure is suitably applicable to the bumper beam 2 of the vehicle as well as peripheral parts of the bumper beam 2 which are prone to exposure to large vibration in the up-down direction.

Meanwhile, when the sensor case 50 is about to move in the direction toward the opening B1, an inner end wall part in the vehicle width direction of the concave portion 50d of the sensor case 50 comes into contact with the protruding portion 65 of the sensor attachment portion 60, thereby controlling such a movement.

Here, an opening that takes on a rectangular shape in lateral view is provided on an inner side in the vehicle width direction of the sensor attachment structure 1A by using the bottom wall portion 61 and the rear wall portion 62 of the sensor attachment portion 60 as well as a rear end part of the inner wall portion 71 and the inclined upper wall portion 73 of the cover 70.

An outer side surface in the vehicle width direction of the upper flange portion 50c of the sensor case 50 is in contact with an upper edge part of this opening, while an outer side surface in the vehicle width direction of the lower flange portion 50c is in contact with a lower edge part of this opening.

The sensor attachment structure 1A according to the embodiment of the present invention includes the panel body (the energy absorption member 6), the sensor attachment portion 60 provided to the panel body and configured to attach the sensor case 50 that houses the sensor (the pressure sensor 5), and the cover 70 configured to define the space to house the sensor case 50 between the cover 70 and the sensor attachment portion 60. The sensor case 50 is attached to the sensor attachment portion 60 by locking, and at least one of the sensor case 50, the sensor attachment portion 60, and the cover 70 includes the fall preventing structure configured to prevent the sensor case 50 from falling off the opening B1 formed by the sensor attachment portion 60 and the cover 70.

Therefore, the sensor attachment structure 1A is attached to the sensor attachment portion 60 of the panel body by means of locking the sensor case 50 without using screws. Accordingly, it is possible to properly prevent the detachment of the sensor case 50 due to vibration. In addition, since the fall preventing structure is provided, the sensor case 50 can be prevented from falling off the opening B1 even when the locking region ceases to function due to a breakage or the like.

Meanwhile, in the sensor attachment structure 1A, the opening B1 serving as the fall preventing structure has a shape that prohibits passage of the sensor case 50.

Therefore, the sensor attachment structure 1A can achieve prevention of the sensor case 50 from falling off by use of the simple structure.

In the meantime, in the sensor attachment structure 1A, the fall preventing structure includes the concave portion 65a provided to the sensor attachment portion 60 and configured to allow insertion of the convex portion 50e of the sensor case 50, and a wall portion (the front wall portion 75) of the cover located on an opposite side of the convex portion 50e and facing the sensor case 50. Here, the insertion length L3 of the convex portion 50e into the concave portion 65a is larger than the gap length L4 between the sensor case 50 and the wall portion of the cover 70 on the opposite side of the convex portion 50e.

Therefore, the sensor attachment structure 1A can properly prevent the sensor case 50 from falling off the opening B1 even when the locking region ceases to function due to a breakage or the like.

Meanwhile, in the sensor attachment structure 1A, the convex portion 50e is inserted into the concave portion 65a in the direction substantially orthogonal to the up-down direction, and the sensor case 50 is locked with the sensor attachment portion 60 in the direction substantially orthogonal to the up-down direction.

Therefore, when the sensor attachment structure 1A is applied to a vehicle, for example, the sensor case 50 is locked in the direction substantially orthogonal to the up-down direction that is the main input direction of vibration. Accordingly, it is possible to properly prevent the sensor case 50 from falling off the sensor attachment portion 60 due to vibration.

In the meantime, in the sensor attachment structure 1A, the sensor attachment portion 60 includes the lock portion 63 in the convex shape to be inserted into the concave portion 50a of the sensor case 50. Here, the concave portion 50a of the sensor case 50 and the lock portion 63 come into contact with each other in the direction substantially orthogonal to the up-down direction. Moreover, the sensor attachment portion 60 includes the protruding portion 65 located in the vicinity of the concave portion 50a and of the lock portion 63 and configured to enhance the locked state of the concave portion 50a and the lock portion 63.

Therefore, the sensor attachment structure 1A can more properly prevent the displacement between the sensor case 50 and the sensor attachment portion 60, enhance an extraction load of the lock portion 63, and more properly prevent the sensor case 50 from falling off the sensor attachment portion 60 due to vibration.

Meanwhile, the sensor attachment structure 1A includes the concave portion 65a provided to the sensor attachment portion 60 and serving as the fall preventing structure to allow insertion of the convex portion 50e of the sensor case 50. Here, the direction of insertion of the convex portion 50e into the concave portion 65a is substantially orthogonal to the up-down direction.

Therefore, the sensor attachment structure 1A has resistance to vibration in the up-down direction and can enhance applicability to the bumper beam of the vehicle or to peripheral parts.

In the meantime, in the sensor attachment structure 1A, the sensor attachment portion 60 includes the lock portion 63 to be locked with the concave portion 50a of the sensor case 50. Here, the concave portion 50a and the lock portion 63 are covered with the wall portion (the upper wall portion 76) of the cover 70 facing the concave portion 50a, and the insertion length L1 of the lock portion 63 into the concave portion 50a is larger than the gap length L2 between the lock portion 63 and the wall portion of the cover 70.

Therefore, the sensor attachment structure 1A can properly prevent the sensor case 50 from falling off the sensor attachment portion 60 due to vibration even when the lock portion 63 moves due to the vibration and the like.

Meanwhile, in the sensor attachment structure 1A, the cover 70 is locked with the panel body and fixed by using the screw N.

Therefore, even if one of the locking function and the fixing function of the screw is lost, the sensor attachment structure 1A can still prevent the cover 70 from falling off the panel body. Thus, it is possible to improve fixation durability of the panel body to the cover 70.

In the meantime, in the sensor attachment structure 1A, the cover 70 includes the lock portion 71a to be locked with the end part of the panel body, and the projecting portion 74a to be inserted into the hole portion 15b of the panel body. Here, the projecting portion 74a and the hole portion 15b collectively function as the positioning portion when attaching the cover 70 to the panel body, and as the detachment preventing portion that prevents the cover 70 from moving pivotally about the lock portion 71a in the direction to be detached from the panel body.

Therefore, in the sensor attachment structure 1A, the functions of the positioning portion and the detachment preventing portion are integrated in the projecting portion 74a and the hole portion 15b and the structure can be thus simplified.

Meanwhile, in the sensor attachment structure 1A, the projecting portion 74a and the hole portion 15b collectively function as the turn preventing portion that prevents the cover 70 from being turned in the case of engagement by using the screw N.

Therefore, in the sensor attachment structure 1A, the function of the turn preventing portion is further integrated in the projecting portion 74a and the hole portion 15b. Thus, the structure can be simplified and costs and the weight can be reduced as well.

In the meantime, the second energy absorption structure according to the embodiment of the present invention includes the sensor attachment structure 1A. Here, the sensor is the pressure sensor 5. The panel body includes the plate-shaped rear wall portion 10 that extends in the vehicle width direction, and the extension wall portion 21 that extends in the vehicle width direction and extends forward from the intermediate part in the height direction of the rear wall portion 10. The rear wall portion 10 takes on the arch shape that projects forward in plan view. The extension wall portion 21 is inclined downward or upward from a rear end part toward a front end part. The second energy absorption structure further includes the reinforcement member 40 facing the extension wall portion 21, and the pressure generation tube 4 connected to the pressure sensor 5. Here, the pressure generation tube 4 is held by the rear wall portion 10, the extension wall portion 21, and the reinforcement member 40.

Therefore, the second energy absorption structure is capable of preventing the sensor case 50 from falling off and thus maintaining a pressure detection function even when the locking region ceases to function due to vibration or the like.

Moreover, the second energy absorption structure is capable of increasing an amount of energy absorption by causing the extension wall portion 21 to develop the out-of-plane deformation in case of a front collision, and thus reducing the dimension in the front-rear direction while securing the amount of energy absorption in case of the front collision.

Furthermore, the second energy absorption structure is capable of absorbing even more energy by the combination of the extension wall portion 21 and the reinforcement member 40.

In addition, the second energy absorption structure uses the front collision load to squash the pressure generation tube 4 held by the rear wall portion 10, the extension wall portion 21, and the reinforcement member 40, and can thus detect the collision (the front collision) appropriately.

Here, when a colliding object collides with the extension wall portion 21 in the vicinity of the central part in the vehicle width direction thereof, an amount of displacement in the front-rear direction of the extension wall portion 21 is not constant in terms of the vehicle width direction but is increased in the vicinity of the colliding region and decreased gradually in a lateral direction (toward the end part in the vehicle width direction). For this reason, a ridge line of a portion of the extension wall portion 21 deformed by the collision takes on a substantially arc shape. This is due to the following reason. Specifically, since the shapes of the rear wall portion 10 and the extension wall portion 21 that extends forward from the rear wall portion 10 take on the arch shape in plan view, the rigidity of the end part in the vehicle width direction of the extension wall portion 21 is higher than the rigidity of the central part thereof. Accordingly, when the colliding object collides with the extension wall portion 21 in the vicinity of the central part in the vehicle width direction, a distortion occurs between the central part of the extension wall portion 21 and the end part in the vehicle direction thereof, and the extension wall portion 21 develops the out-of-plane deformation. In this way, it is possible to increase the amount of energy absorption in case of the front collision.

Likewise, when the colliding object collides with the extension wall portion 21 in the vicinity of the end part in the vehicle width direction, a distortion occurs between the central part of the extension wall portion 21 and the end part in the vehicle direction thereof, and the extension wall portion 21 develops the out-of-plane deformation. In this way, it is possible to increase the amount of energy absorption in case of the front collision.

The embodiment of the present invention has been described above in detail. It is to be noted, however, that the present invention is not limited only to the above-described embodiment and various changes are possible within the range not departing from the scope of the present invention. For example, the sensor attachment structure 1A is applicable to various sensors (such as a G sensor, a camera, and a radar) other than the pressure sensor in a vehicle as well as to various sensors not involving a vehicle. Meanwhile, the sensor case 50 may lack the flange portion 50c and may be configured such that an opening defined on the inner side in the vehicle width direction by using the sensor attachment portion 60 and the cover 70 may be blocked by the inner wall portion 71 of the cover 70. In the meantime, the panel body is not limited only to the energy absorption member 6, but may instead be any of a bulkhead, a bumper beam, a front side frame, and the like.

What is claimed is:

1. A sensor attachment structure comprising:
a panel body;
a sensor attachment portion provided to the panel body and configured to attach a sensor case that houses a sensor; and
a cover configured to define a space to house the sensor case between the cover and the sensor attachment portion, wherein
the sensor case is attached to the sensor attachment portion by locking,
at least one of the sensor case, the sensor attachment portion, and the cover includes a fall preventing structure configured to prevent the sensor case from falling off an opening formed by the sensor attachment portion and the cover,
the sensor attachment portion includes a first lock portion in a convex shape to be inserted into a first concave portion of the sensor case,
the first concave portion of the sensor case and the first lock portion come into contact with each other in a direction substantially orthogonal to the up-down direction, and
the sensor attachment portion includes a protruding portion located in the vicinity of the first concave portion and of the first lock portion and configured to enhance a locked state of the first concave portion and the first lock portion.

2. The sensor attachment structure according to claim 1, wherein
the opening serving as the fall preventing structure has a shape that prohibits passage of the sensor case.

3. The sensor attachment structure according to claim 1, wherein
the fall preventing structure includes
a second concave portion provided to the sensor attachment portion and configured to allow insertion of a convex portion of the sensor case, and
a wall portion of the cover located on an opposite side of the convex portion and facing the sensor case, and
an insertion length of the convex portion into the second concave portion is larger than a gap length between the sensor case and the wall portion of the cover on the opposite side of the convex portion.

4. The sensor attachment structure according to claim 3, wherein
the convex portion is inserted into the second concave portion in a direction substantially orthogonal to an up-down direction, and
the sensor case is locked with the sensor attachment portion in the direction substantially orthogonal to the up-down direction.

5. The sensor attachment structure according to claim 1, further comprising:
a second concave portion provided to the sensor attachment portion and serving as the fall preventing structure to allow insertion of a convex portion of the sensor case, wherein
a direction of insertion of the convex portion into the second concave portion is substantially orthogonal to an up-down direction.

6. The sensor attachment structure according to claim 1, wherein the cover is locked with the panel body and fixed by using a screw.

7. The sensor attachment structure according to claim 6, wherein
the cover includes
a second lock portion to be locked with an end part of the panel body, and
a projecting portion to be inserted into a hole portion of the panel body, and
the projecting portion and the hole portion collectively function as a positioning portion when the cover and the panel body are attached to each other, and as a detachment preventing portion that prevents the cover from moving pivotally about the second lock portion in a direction to be detached from the panel body.

8. The sensor attachment structure according to claim 7, wherein the projecting portion and the hole portion collectively function as a turn preventing portion that prevents the cover from being turned in a case of engagement by using a screw.

9. An energy absorption structure comprising:
the sensor attachment structure according to claim 1, wherein
the sensor is a pressure sensor,
the panel body includes
a plate-shaped rear wall portion extending in a vehicle width direction, and
an extension wall portion extending in the vehicle width direction and extending forward from an intermediate part in a height direction of the rear wall portion,
the rear wall portion takes on an arch shape that projects forward in plan view, the extension wall portion is inclined downward or upward from a rear end part toward a front end part, the energy absorption structure further includes
a reinforcement member facing the extension wall portion, and
a pressure generation tube connected to the pressure sensor, and the pressure generation tube is held by the rear wall portion, the extension wall portion, and the reinforcement member.

10. A sensor attachment structure comprising:

a panel body;

a sensor attachment portion provided to the panel body and configured to attach a sensor case that houses a sensor; and a cover configured to define a space to house the sensor case between the cover and the sensor attachment portion, wherein the sensor case is attached to the sensor attachment portion by locking, and at least one of the sensor case, the sensor attachment portion, and the cover includes a fall preventing structure configured to prevent the sensor case from falling off an opening formed by the sensor attachment portion and the cover, wherein the sensor attachment portion includes a lock portion to be locked with a concave portion of the sensor case, the concave portion and the lock portion are covered with a wall portion of the cover facing the concave portion, and an insertion length of the lock portion into the concave portion is larger than a gap length between the lock portion and the wall portion of the cover.

11. An energy absorption structure comprising:

a sensor attachment structure including a panel body;

a sensor attachment portion provided to the panel body and configured to attach a sensor case that houses a sensor; and a cover configured to define a space to house the sensor case between the cover and the sensor attachment portion, wherein the sensor case is attached to the sensor attachment portion by locking, and at least one of the sensor case, the sensor attachment portion, and the cover includes a fall preventing structure configured to prevent the sensor case from falling off an opening formed by the sensor attachment portion and the cover, wherein the sensor is a pressure sensor, the panel body includes
a plate-shaped rear wall portion extending in a vehicle width direction, and an extension wall portion extending in the vehicle width direction and extending forward from an intermediate part in a height direction of the rear wall portion, the rear wall portion takes on an arch shape that projects forward in plan view, the extension wall portion is inclined downward or upward from a rear end part toward a front end part, the energy absorption structure further includes
a reinforcement member facing the extension wall portion, and
a pressure generation tube connected to the pressure sensor, and the pressure generation tube is held by the rear wall portion, the extension wall portion, and the reinforcement member.

\* \* \* \* \*